(12) United States Patent
Brunet et al.

(10) Patent No.: US 8,069,271 B2
(45) Date of Patent: Nov. 29, 2011

(54) SYSTEMS AND METHODS FOR CONVERTING A MEDIA PLAYER INTO A BACKUP DEVICE

(75) Inventors: Jeffrey Brunet, Richmond Hill (CA); Yousuf Chowdhary, Maple (CA); Ian Collins, Markham (CA); Hai Sheng Pan, Richmond Hill (CA); Valeriy Kusov, Mississauga (CA)

(73) Assignee: Storage Appliance Corporation, Richmond Hill (CA)

( * ) Notice: Subject to any disclaimer, the term of this patent is extended or adjusted under 35 U.S.C. 154(b) by 294 days.

(21) Appl. No.: 12/156,316

(22) Filed: May 30, 2008

(65) Prior Publication Data

US 2008/0243466 A1  Oct. 2, 2008

Related U.S. Application Data

(60) Continuation-in-part of application No. 11/506,386, filed on Aug. 18, 2006, now Pat. No. 7,818,160, which is a division of application No. 11/492,380, filed on Jul. 24, 2006, now Pat. No. 7,813,913.

(60) Provisional application No. 60/725,225, filed on Oct. 12, 2005, provisional application No. 60/814,687, filed on Jun. 19, 2006, provisional application No. 60/817,540, filed on Jun. 30, 2006, provisional application No. 60/933,511, filed on Jun. 7, 2007.

(51) Int. Cl.
*G06F 3/00* (2006.01)
(52) U.S. Cl. .................... 710/5; 710/2; 710/36; 710/67; 710/74; 703/23; 703/24

(58) Field of Classification Search ........................ None
See application file for complete search history.

(56) References Cited

U.S. PATENT DOCUMENTS

| 5,212,784 | A  | 5/1993  | Sparks   |
| 5,835,759 | A  | 11/1998 | Moore    |
| 5,959,280 | A  | 9/1999  | Kamatani |
| 6,131,148 | A  | 10/2000 | West     |
| 6,282,710 | B1 | 8/2001  | Boehler  |

(Continued)

FOREIGN PATENT DOCUMENTS

EP  1168322 A1  1/2002

(Continued)

OTHER PUBLICATIONS

Mirra.com, "Frequently Asked Questions about Mirra" Feb. 2005, Mirra.com and Archive.org <http://web.archive.org/web/20050206184942/www.mirra.com/product/file_backup_guide.html>, pp. 1-5.

(Continued)

*Primary Examiner* — Eron J Sorrell
(74) *Attorney, Agent, or Firm* — Gard & Kaslow LLP

(57) ABSTRACT

A data backup system is provided that when coupled to a data source, such as a personal computer, and a media player, such an Apple Computer IPod media player, the data backup system blocks certain communications between the data source and the media player thus preventing the data source from recognizing the media player as such thereby avoiding the launching of synchronization software for the media player, the data backup system also causing the automatic launching of a backup application stored on the data backup system so that data files can be located on the data source and then backed up to the media player.

12 Claims, 9 Drawing Sheets

U.S. PATENT DOCUMENTS

| | | | |
|---|---|---|---|
| 6,411,943 B1 | 6/2002 | Crawford | |
| 6,469,967 B1 | 10/2002 | Mau | |
| 6,473,794 B1 | 10/2002 | Guheen | |
| 6,487,558 B1 | 11/2002 | Hitchcock | |
| 6,496,979 B1 | 12/2002 | Chen et al. | |
| 6,529,992 B1 | 3/2003 | Thomas | |
| 6,567,273 B1 | 5/2003 | Liu | |
| 6,603,676 B2 | 8/2003 | Kitagawa | |
| 6,611,850 B1 | 8/2003 | Shen | |
| 6,654,797 B1 | 11/2003 | Kamper | |
| 6,684,229 B1 | 1/2004 | Luong et al. | |
| 6,701,456 B1 | 3/2004 | Biessener | |
| 6,813,682 B2* | 11/2004 | Bress et al. | 711/112 |
| 6,813,725 B1 | 11/2004 | Hanes | |
| 6,839,721 B2 | 1/2005 | Schwols | |
| 6,845,464 B2 | 1/2005 | Gold | |
| 6,868,227 B2 | 3/2005 | Luman | |
| 6,889,376 B1 | 5/2005 | Barritz | |
| 6,901,493 B1 | 5/2005 | Maffezzoni | |
| 7,024,529 B2 | 4/2006 | Yamada | |
| 7,095,519 B1 | 8/2006 | Stewart | |
| 7,136,288 B2 | 11/2006 | Hoogerdijk | |
| 7,137,034 B2 | 11/2006 | Largman | |
| 7,162,500 B2 | 1/2007 | Iguchi | |
| 7,165,082 B1 | 1/2007 | DeVos | |
| 7,200,546 B1 | 4/2007 | Nourmohamadian | |
| 7,207,033 B2 | 4/2007 | Kung | |
| 7,213,766 B2 | 5/2007 | Ryan et al. | |
| 7,266,668 B2 | 9/2007 | Hartung | |
| 7,302,538 B2 | 11/2007 | Liu | |
| 7,305,577 B2 | 12/2007 | Zhang | |
| 7,308,528 B2 | 12/2007 | Kitamura | |
| 7,330,997 B1 | 2/2008 | Odom | |
| 7,334,226 B2 | 2/2008 | Ramachandran et al. | |
| 7,363,510 B2 | 4/2008 | Bobrow | |
| 7,401,194 B2 | 7/2008 | Jewell | |
| 7,461,144 B1 | 12/2008 | Beloussov | |
| 7,519,767 B2 | 4/2009 | Slater | |
| 7,558,928 B1 | 7/2009 | DeVos | |
| 7,606,946 B2 | 10/2009 | Kobayashi et al. | |
| 7,739,429 B2* | 6/2010 | Shih | 710/62 |
| 7,761,456 B1 | 7/2010 | Cram et al. | |
| 7,818,160 B2 | 10/2010 | Collins et al. | |
| 2001/0056425 A1 | 12/2001 | Richard | |
| 2002/0023198 A1 | 2/2002 | Kokubun et al. | |
| 2002/0026575 A1 | 2/2002 | Wheeler et al. | |
| 2002/0064111 A1 | 5/2002 | Horie | |
| 2002/0112171 A1 | 8/2002 | Ginter et al. | |
| 2002/0184559 A1* | 12/2002 | Qin et al. | 714/13 |
| 2003/0011809 A1 | 1/2003 | Suzuki et al. | |
| 2003/0050940 A1 | 3/2003 | Robinson | |
| 2003/0105643 A1 | 6/2003 | Chen et al. | |
| 2003/0149662 A1 | 8/2003 | Shore | |
| 2003/0195737 A1 | 10/2003 | Shapiro et al. | |
| 2003/0233525 A1* | 12/2003 | Reeves | 711/162 |
| 2004/0044863 A1 | 3/2004 | Trimmer et al. | |
| 2004/0153614 A1 | 8/2004 | Bitner et al. | |
| 2004/0193744 A1 | 9/2004 | Paley | |
| 2004/0199600 A1 | 10/2004 | Dorundo | |
| 2004/0230653 A1 | 11/2004 | Liao | |
| 2004/0230863 A1 | 11/2004 | Buchhorn | |
| 2004/0243745 A1 | 12/2004 | Bolt | |
| 2005/0027956 A1 | 2/2005 | Tormasov et al. | |
| 2005/0033911 A1 | 2/2005 | Kitamura et al. | |
| 2005/0052548 A1 | 3/2005 | Delaney | |
| 2005/0060356 A1 | 3/2005 | Saika | |
| 2005/0071524 A1 | 3/2005 | Liu et al. | |
| 2005/0081006 A1 | 4/2005 | Shackelford et al. | |
| 2005/0086326 A1 | 4/2005 | Manning et al. | |
| 2005/0114450 A1 | 5/2005 | DeVos | |
| 2005/0157315 A1 | 7/2005 | Kato | |
| 2005/0157603 A1 | 7/2005 | Tseng | |
| 2005/0182872 A1 | 8/2005 | Shih | |
| 2005/0193389 A1 | 9/2005 | Murphy | |
| 2005/0213146 A1 | 9/2005 | Parulski | |
| 2005/0226059 A1 | 10/2005 | Kavuri et al. | |
| 2005/0228836 A1 | 10/2005 | Bacastow | |
| 2005/0246583 A1 | 11/2005 | Robinson | |
| 2005/0268339 A1 | 12/2005 | Bobrow | |
| 2006/0059308 A1 | 3/2006 | Uratani et al. | |
| 2006/0069921 A1 | 3/2006 | Camaisa et al. | |
| 2006/0075293 A1 | 4/2006 | Bodlaender et al. | |
| 2006/0101191 A1 | 5/2006 | Pinson | |
| 2006/0123189 A1 | 6/2006 | Bitner et al. | |
| 2006/0161635 A1 | 7/2006 | Lamkin et al. | |
| 2006/0161802 A1 | 7/2006 | Wang et al. | |
| 2006/0164891 A1 | 7/2006 | Mills | |
| 2006/0198202 A1 | 9/2006 | Erez | |
| 2006/0200623 A1 | 9/2006 | Gonzalez et al. | |
| 2006/0218435 A1 | 9/2006 | van Ingen et al. | |
| 2006/0224846 A1 | 10/2006 | Amarendran et al. | |
| 2007/0006017 A1 | 1/2007 | Thompson et al. | |
| 2007/0043888 A1 | 2/2007 | Suzuki et al. | |
| 2007/0043898 A1 | 2/2007 | Ozeki et al. | |
| 2007/0043973 A1 | 2/2007 | Schneider | |
| 2007/0083354 A1 | 4/2007 | Collins et al. | |
| 2007/0179955 A1 | 8/2007 | Croft et al. | |
| 2007/0214332 A1 | 9/2007 | Sonoda et al. | |
| 2007/0250655 A1 | 10/2007 | Ferchau et al. | |
| 2008/0133827 A1 | 6/2008 | Topham et al. | |
| 2008/0215873 A1 | 9/2008 | Bobrow | |

FOREIGN PATENT DOCUMENTS

| | | | |
|---|---|---|---|
| EP | 1233409 A2 | 8/2002 | |
| EP | 1717697 A2 | 11/2006 | |
| WO | 2005086002 A1 | 9/2005 | |
| WO | WO 2005086002 A1 * | 9/2005 | |

OTHER PUBLICATIONS

Mirra.com, "Why Mirra is Different . . . and Better" Feb. 2005, Mirra.com and Archive.org <http://web.archive.org/web/20050206192005/www.mirra.com/product/why_mirra_is_different.html>, p. 5.

Page 2 from the following web page archived on Jan. 25, 2005: http://web.archive.org/web/20050125085304/http://www.bjorn3d.com/read.php?cID=748.

Scott Clark, "U3—Official Portable USB Apps Platform", Oct. 12, 2005, Everything USB website via Archive.org, , www.everythingusb.com/u3.html>, pp. 1-5.

IBM, "Automatic Tape Backup of Customer's Critical Direct Access Storage Device Areas". IBM Technical Disclosure Bulletin, vol. 39, Issue 12, pp. 37-38. Dec. 1, 1996.

Wikipedia, "Image File Formats" Jul. 13, 2006, Wikipedia.org, p. 1-5.

Wikipedia, "Audio file format" Jul. 29, 2006, Wikipedia.org, p. 1-4.

Wikipedia, "MPEG-4 Part 14" Jun. 5, 2006, Wikipedia.org, p. 1-3.

Seagate, "Enhanced Drive Self-Test—Winning the War Against Unnecessary Drive Returns", Jun. 2000, Seagate, pp. 1-4.

"LapBack 1.9.8", CNET.com, Sep. 3, 2005.

"LapBack U3", Software Central, copyright 2005.

Scott Clark, "U3—Official Portable USB Apps Platform", Oct. 13, 2005, Everything USB website via Archive.org, <www.everythingusb.com/u3.html>, pp. 1-5.

Brown University, "Image File Format" Jun. 22, 2006, www.archive.org <http://web.archive.org/web/20060622060840/http://cs.brown.edu/stc/summer/workshop/summer_formats.html>, p. 1-2.

Dr. Caroline Musselwhite et al., "AAC Intervention" 2005 <http://www.aacintervention.com/tipfive.html>, pp. 1-3.

Dr. Caroline Musselwhite et al., "About Graphics/Digital Images" AACIntervention, pp. 1-6.

PCMag, "U3 Preview," Sep. 21, 2005.

U3, "U3 Smart Drive Computing Platform," Jun. 2005.

\* cited by examiner

SYSTEMS AND METHODS FOR CONVERTING A MEDIA PLAYER INTO A BACKUP DEVICE

CROSS-REFERENCE TO RELATED APPLICATIONS

This application is a Continuation-in-Part of U.S. Non-Provisional patent application Ser. No. 11/506,386 filed on Aug. 18, 2006 now U.S. Pat. No. 7,818,160 and entitled "Data Backup Devices and Methods for Backing up Data" which is a divisional application of U.S. Non-Provisional patent application Ser. No. 11/492,380 filed on Jul. 24, 2006 now U.S. Pat. No. 7,813,913 and entitled "Emulation Component for Data Backup Applications" which claims the benefit of U.S. Provisional Patent Application No. 60/725,225 filed on Oct. 12, 2005 and entitled "A Method, Apparatus and a System for Removable Media Device Emulation on an External Storage Device via an Emulation Component for the Purpose of an Electronic Data Backup Appliance;" U.S. Provisional Patent Application No. 60/814,687 filed on Jun. 19, 2006 and entitled "Portable Electronic Data Backup Appliance Based on Integrated Circuit (IC) Memory," and U.S. Provisional Patent Application No. 60/817,540 filed on Jun. 30, 2006 and entitled "Portable Data Backup Appliance for Utilizing a Recordable Media Burner Device;" this application also claims the benefit of U.S. Provisional Patent Application No. 60/933,511 filed on Jun. 7, 2007 and entitled "Method and a System for Converting an iPod/MP3/Media Player into a Backup Device." Each of the aforementioned applications is incorporated herein by reference.

BACKGROUND OF THE INVENTION

1. Field of the Invention

The present invention relates generally to the field of digital data management and more particularly to systems for data backup applications.

2. Description of the Prior Art

Digital content, represented by digital data files of various file types, is rapidly replacing other forms of content. Documents, presentations, photos, movies, and music, for example, are increasingly produced and stored digitally. A problem for many individuals and organizations is that digital content, typically stored on a computer hard drive, can be poorly organized and needs to be archived to be protected against accidental loss. For example, digital photo files on a personal computer (PC) are likely to be found in numerous folders—photos transferred from a digital camera are stored in one set of folders, photos received as e-mail attachments are stored in other folders, and photos downloaded from websites are stored in still other folders.

One approach to archiving digital content is to periodically backup all of the data files on the computer, preserving the existing organizational structure. While this technique is effective to preserve digital content against accidental loss, the technique has several shortcomings. For one, the resulting copy is no better organized than the original, so misplaced or disorganized content remains misplaced or disorganized. Also, backing up all data files requires substantial memory capacity to copy numerous files that are otherwise already preserved elsewhere. Application specific files, for example, originally loaded onto the computer from a compact disc (CD) are already archived on the CD and therefore do not need to be backed up.

The necessary storage capacity for a complete backup can be obtained with writable data storage media, such as hard disc drives (HDDs), however, these require device installation and software set-up when first connected to a system. In order to complete these steps, a user may have to provide information about the existing system, which the user may not readily know. Also, the user may have to make decisions regarding the configuration of the device and the backup software. The number of steps involved with installation and set-up, as well as the complexity of some of the steps, dissuades many users from bothering with backup applications. The expense of a writable data storage media with enough capacity to perform a complete backup can also dissuade users from performing complete backups. Furthermore, some users, having bought and installed the necessary storage capacity, are dissuaded from performing frequent backups due to the length of time the system is tied up while performing a complete backup.

Alternately, a user can manually select a set of files from a directory and copy the selected files to a storage device. While this alternative may allow usage of a smaller memory device that does not require installation and set-up steps, manually selecting files is time-consuming. Also, manually selecting files creates the possibility of an accidental omission of some files.

Further, many users already own and use media players such as the IPOD media player by Apple Computer which contain hard disk drives or flash memory. And it is known that these devices can be used to store data files in addition to the media content which is their primary intended use. However, using such devices for storing data files typically requires configuring the media player in a special fashion which is beyond the knowledge, capabilities or interest of a typical user. For this reason, media players are rarely used for data storage purposes by the typical user.

What is needed, therefore, is the ability to backup digital content to a media player in a manner that is inexpensive, convenient, and complete.

SUMMARY

An exemplary data backup system comprises a communication interface, a first storage device, and an emulation component. The first storage device includes a writable data storage medium comprising first and second logical storage areas, and in some embodiments the first logical storage area stores a data backup application. The emulation component is in communication between the first storage device and the communication interface. The emulation component comprises logic configured to represent the first logical storage area as an auto-launch device, and additional logic configured to represent the second logical storage area as a second storage device including a writable data storage medium. It will be appreciated that the logic of the emulation component can be implemented through software, hardware, firmware, or a combination thereof.

The emulation component of the exemlary data backup system can also comprise, in some embodiments, logic configured to receive auto-launch device commands from the communication interface, translate the auto-launch device commands to first storage device commands, and send the first storage device commands to the first logical storage area, and additional logic configured to receive first storage device responses from the first logical storage area, translate the first storage device responses into auto-launch device responses, and send the auto-launch device responses to the communication interface. The emulation component can further comprise logic configured to receive second storage device commands from the communication interface and send the second storage device commands to the second logical storage area, and additional logic configured to receive second storage device responses from the second logical storage area, and send the second storage device responses to the communication interface.

In some embodiments the first storage device comprises a HDD, and in some of these embodiments the first and second logical storage areas comprise first and second partitions of the HDD. In other embodiments the first storage device comprises solid-state memory or an optical device. Suitable solid state memories include any solid state memory that can be written at least once, including a Secure Digital (SD) memory card, a Compact Flash (CF) memory card, or a memory stick. Suitable optical devices include CD and Digital Video Disc (DVD) drives. Exemplary writable data storage media for these drives include Compact Disc-Recordable (CD-R) and Compact Disc ReWritable (CD-RW) media, and Digital Video Disc-Recordable (DVD−R and DVD+R) and Digital Video Disc ReWritable (DVD−RW and DVD+RW) media, respectively.

An exemplary method for backing up data stored on a data source comprises returning a response to an inquiry from the data source. The response identifies a first storage device of a first device type as instead being of a second device type. Here, the second device type belongs to a class of device types that, upon connection to the data source, will trigger an operating system of the data source to automatically execute a backup application stored on the first storage device. The exemplary method further comprises providing the backup application to the data source to selectively copy data stored on the data source. Providing the backup application includes receiving auto-launch device commands from the data source, translating the auto-launch device commands into first storage device commands, and sending the first storage device commands to the storage device. Providing the backup application also includes receiving first storage device responses from the first storage device, translating the first storage device responses into auto-launch device responses, and sending the auto-launch device responses to the data source.

In some embodiments, the method for backing up data stored on the data source also comprises selectively copying data files to a second storage device, and in some embodiments the first storage device comprises the second storage device. In other embodiments, selectively copying data files includes sending copied files to a web-based storage facility. Selectively copying data files can include searching one or more storage devices associated with the data source for data files that meet a predefined criterion, for example, that the data files have not previously been copied to a data backup system, or that the data files have a file type associated with a type of content. Selectively copying data files can also include creating a directory structure on the second storage device to indicate the location of a copied file on the data source. Selectively copying data files can further include determining whether a data source has been previously paired with a data backup system. Selectively copying data files can be initiated, in some embodiments, by a user command or by connecting a removable storage device to a communication port of a data backup system.

Another exemplary backup system comprises a first communication interface for communication with a data source, a second communication interface for communication with a media player, a storage device including computer-readable instructions of a backup application configured to backup data files from the data source to the media player, and an emulation component in communication between the first communication interface, the second communication interface, and the storage device. The emulation component is configured to block certain communications between the data source and the media player, represent the storage device as an auto-launch device, represent the storage device as an auto-launch device, receive auto-launch device commands from the data source addressed to the auto-launch device, translate the auto-launch device commands to storage device commands, and send the storage device commands to the storage device, and receive storage device responses from the storage device, translate the storage device responses into auto-launch device responses, and send the auto-launch device responses to the data source.

Still another exemplary backup system comprises a first communication interface, a second communication interface, a first storage device containing a backup application, and an emulation component in communication between the first communication interface, the second communication interface, and the storage device. The emulation component comprises logic configured to represent the first storage device as an auto-launch device and logic configured to block certain communications between a media player coupled to the first communication interface and a data source coupled to the second communication interface.

Yet another exemplary backup system comprises a first communication interface, a second communication interface, a first storage device containing a backup application and an emulation component in communication between the first storage device and the first communication interface. The emulation component comprises logic configured to represent the first storage device as an auto-launch device and logic configured to block certain communications between a media player coupled to the first communication interface and a data source coupled to the second communication interface in a first mode and to pass all communications between the media player coupled to the first communication interface and the data source coupled to the second communication interface in a second mode.

An exemplary method comprises automatically launching a backup application to run on a data source by connecting a data backup system to the data source, the backup system comprising a storage device including computer-readable instructions of the backup application, outputting from the data backup system to the data source a request for a user to attach the media player to the data backup system, the request for display on the data source, blocking certain communications between the data source and the media player from going through the backup system, and performing a first backup of data files from the data source to the media player using the backup application.

Another exemplary method comprises automatically launching a backup application to run on a data source by connecting a data backup system to a data source, the backup system comprising a storage device including computer-readable instructions of the backup application, connecting the data backup system to a media player, blocking certain communications between the data source and the media player from going through the backup system, and performing a backup of data files from the data source to the media player using the backup application.

DETAILED DESCRIPTION OF THE INVENTION

A data backup system is provided for personal, as well as commercial, applications. The data backup system of the present invention allows files to be selectively copied from a data source, such as a personal computer, to a storage device according to some criteria such as file type. For example, the system can be configured to backup audio files having recognized music file extensions such as .mp3 and .wav, or image files having recognized image file extensions such as .jpg, .pct, and .tif. The data backup system, according to some embodiments, stores a backup application that automatically launches when the data backup system is connected to the data source. The backup application can be configured to require little or no user input to perform the backup process.

The data backup system can take a number of different forms. One example is an appliance that includes both the backup application and sufficient storage capacity for copied files. Another example is a device that includes the backup application arid an interface for connecting sufficient storage capacity in the form of a storage device such as an external HDD or flash memory device. In both examples, the system includes an emulation component. The emulation component makes the portion of the data backup system that contains the backup application appear to the data source as if it were of a particular device type. More specifically, the backup application portion of the data backup system is represented as being one of a class of storage devices referred to herein as "auto-launch devices." Emulating an auto-launch device allows the data backup system to take advantage of automatic execution capabilities of certain operating systems so that the backup application will automatically be executed when the device is connected to a data source running the operating system.

Figure 1:
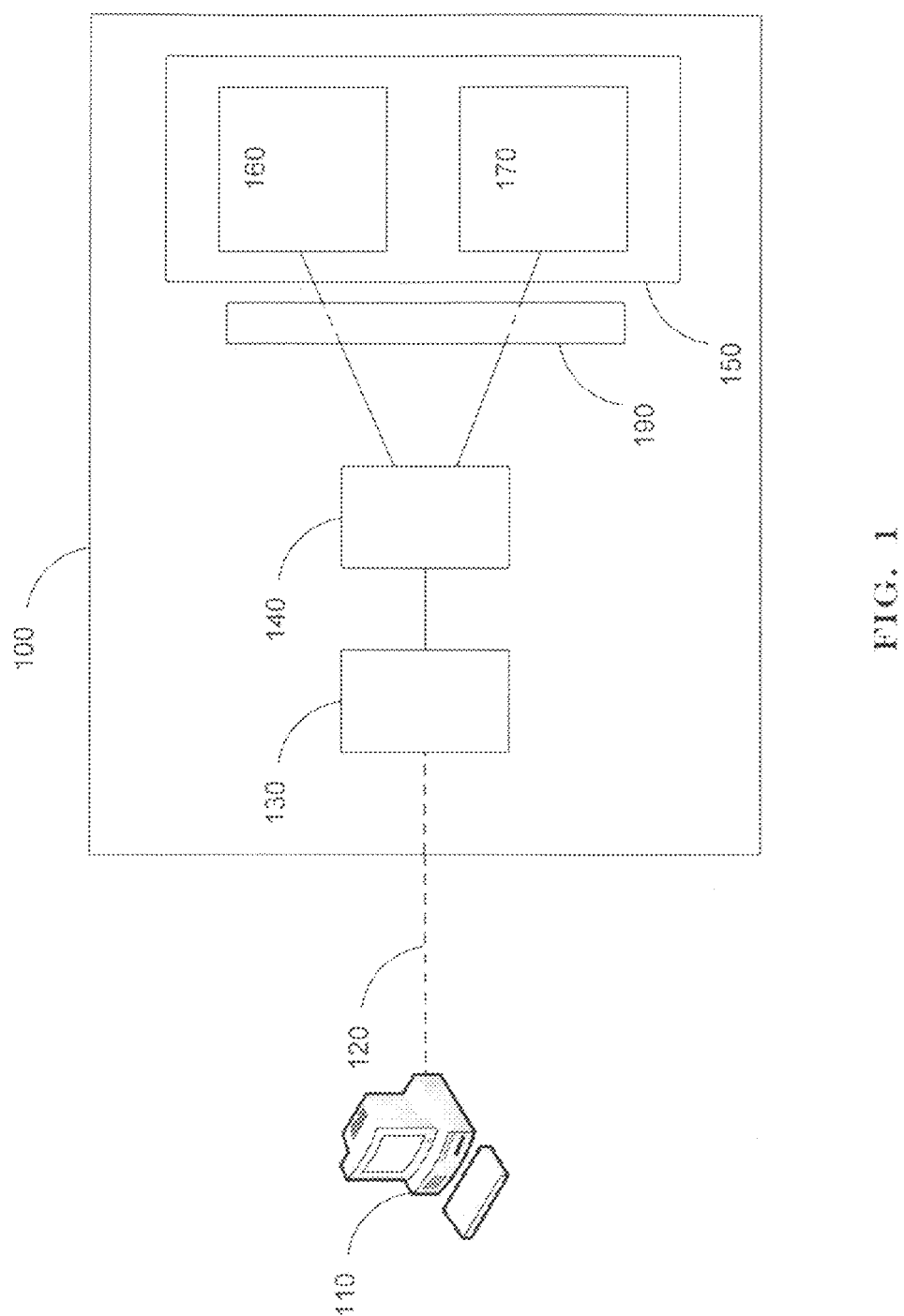
FIG. 1 is a schematic representation of a data backup system according to an exemplary embodiment of the present invention.

FIG. 1 provides a schematic representation of an exemplary embodiment of a data backup system 100 connected to a data source 110 by a connection 120. The data source 110 can be, for example, a personal computer (PC), a Macintosh computer (Mac), or a Personal Digital Assistant (PDA) on which data resides. The data source 110 can also comprise a server, a settop box, a television, a cellular telephone, a Smartphone, a digital still camera or video camera, a scanner, a digital music or video player, a game console, or a Personal Video Recorder (PVR). Preferably, the data source 100 includes an operating system (OS), such as Windows XP, that includes an automatic application launching function, as discussed in more detail elsewhere herein. Other suitable operating systems include MacOS, PalmOS, Linux, and Unix, for example. The connection 120 between the backup system 100 and the data source 110 can be essentially any data transfer mechanism such as an optical or electrical cable, a wireless link, or a network connection. The connection 120 is shown with a dashed line in FIG. 1 to indicate that the connection 120 need only be temporary.

As shown in FIG. 1, the backup system 100 comprises a communication interface 130, an emulation component 140, and a storage device 150 that includes a first logical storage area 160 and second logical storage area 170. The communication interface 130 allows the data source 110 to communicate with the emulation component 140 of the backup system 100 according to a communication protocol. The communication interface 130 can be, for example, USB, FireWire, or a wireless interface such as infrared, Bluetooth, or WiFi.

It will be appreciated that the backup system 100 can include a plurality of communication interfaces 130, of the same or of different types, to accommodate multiple and/or different data sources 110. Depending on the type of communication interface 130, the communication interface 130 can include a communication port through which the connection 120 to the data source 110 is made. For instance, a USB communication interface 130 can include a USB communication port, and a FireWire communication interface 130 can include a FireWire communication port. Alternatively, the communication interface 130 can include a wireless antennae or an infrared transmitter/receiver unit for sending and receiving infrared signals.

The storage device 150 comprises a writable data storage medium and can be, for example, a HDD that has been partitioned into at least two logical storage areas. In this instance, each logical storage area is a partition of the HDD. Suitable HDDs for the storage device 150 include 1.0 inch, 1.8 inch, 2.5 inch, and 3.5 inch hard drives having capacities of 20 to 60 to 100 to 750 gigabytes (GB) or more. Other suitable storage devices 150 that include rewritable media are solid-state memory devices, such as SD memory cards and CF memory cards. The storage device 150 can also be an optical device such as a CD drive or a DVD drive where the writable data storage medium within such an optical storage device 150 can be either a write-once medium, such as a Compact Disc-Recordable (CD-R), DVD-Recordable (DVD–R or DVD+R), or a rewritable medium such as a Compact Disc-Rewritable (CD-RW), or DVD-Rewritable (DVD–RW or DVD+RW).

The storage device 150 can also be implemented by two different devices, one dedicated to each of the two logical storage areas 160, 170. For example, the first logical storage area 160 can be implemented by a CD drive with any CD media, while the second logical storage area 170 is implemented by a HDD. In a further example, the first logical storage area 160 can be implemented by a solid state memory while the second logical storage area 170 is implemented by an optical device with a writable data storage medium. In this further example, the two different devices could be contained within a common housing. It will be understood that the device types, form factors, and capacities provided herein are merely exemplary and not intended to be limiting.

In some embodiments, the backup system 100 further comprises a memory device interface 190 that allows the first and second logical storage areas 160 and 170 to communicate with the emulation component 140. In these embodiments the memory device interface 190 is of a type that is appropriate to the type of storage device 150. For instance, an Integrated Drive Electronics (IDE) interface 190 can be used with an IDE HDD storage device 150, and a Small Computer System Interface (SCSI) interface 190 can be used with a SCSI HDD storage device 150. Alternately, the memory device interface 190 can be a SD memory card host interface where the storage device 150 is a SD memory card. The interface 190 can also be a wireless interface such as infrared, WiFi, and Bluetooth. The memory device interface 190 can be implemented in the backup system 100 by an integrated circuit (IC) chip or through the use of discrete components. The memory device interface 190 is integrated into the memory device 150, in some embodiments. It will be appreciated that in the embodiments noted above that employ multiple storage devices 150, the backup system 100 can include multiple memory device interfaces 190 as appropriate.

The first logical storage area 160 represents a logical area of the memory device 150 that is meant to be inaccessible to the user and safe from accidental erasure. The first logical storage area 160 can contain, for example, a backup application, system files, drivers, and other setup and configuration software. The first logical storage area 160 is represented to the data source 110 by the emulation component 140 as being an auto-launch device. As used herein, auto-launch devices are those devices that will trigger the automatic execution functionalities of certain operating systems, such as the Auto-Run function of the Microsoft Windows operating system. Examples of device types that will trigger AutoRun of Windows include CD and DVD drives when a CD or DVD medium is contained therein. In these examples, the Windows AutoRun functionality is triggered either when the CD/DVD is placed in the CD/DVD drive already connected to the data source 110, or when the CD/DVD drive, already containing the CD/DVD medium, is connected to the data source 110.

The second logical storage area 170 represents a logical area of the memory device 150 that is dedicated to storing backed-up data. Accordingly, the emulation component 140 represents the second logical storage area 170 to the data source as being a device type that includes a writable data storage medium. The second logical storage area 170 can be represented as a HDD, CF, or a SD memory card, for example. In some embodiments, the second logical storage area 170 can be represented as the same type of device as the storage device 150. In other embodiments the second logical storage area 170 can be represented to be a different device type than the storage device 150.

The emulation component 140 provides certain functions to the backup system 100 and can be implemented through logic such as software, firmware, hardware, or any combination of these. It will be understood that within an embodiment different functions of the emulation component can be implemented with different forms of logic. Thus, while one function of the emulation component 140 is implemented through firmware, for example, another function can be implemented through software.

In one embodiment, the emulation component 140 includes an IC. For example, the emulation component 140 can be implemented using software, firmware, hardware, or some combination thereof, incorporated in a USB controller chipset. In some USB-specific embodiments, the emulation component 140 implements some or all of a number of layered industry standards. Examples of such standards include USB Specification—Revision 2.0, USB Mass Storage Class—Bulk Only Transport—Revision 1.0, SCSI Primary Commands—3 (SPC-3), SCSI Block Commands—2 (SBC-2), Multimedia Commands—4 (MMC-4), and AT Attachment with Packet Interface—6 (ATA/ATAPI-6). It should be noted that in some embodiments the emulation component 140 may only support subsets of the commands of these industry standards.

Functions provided by the emulation component 140 can include representing the first logical storage area 160 as an auto-launch device and representing the second logical storage area 170 as a device including a writable data storage medium. Accordingly, the data source 110 will recognize the data backup system 100 as two attached devices when connected to the backup system 100. It should be noted, however, that in some embodiments the contents of these two devices are not accessible to the user of the data source but are accessible by the backup application which is configured with appropriate application programming interface (API) calls. This serves to protect the contents of both the first and second logical storage areas from accidental modification or erasure. To access the backed up data from the second logical storage area 170 in some embodiments, the data backup system 100 restores the data to the data source or copies the data to yet another device. In other embodiments, the virtual device that represents the second logical storage area 170 is accessible to the user while the virtual device that represents the first logical storage area 160 is not accessible. In these embodiments, the user is allowed direct access to the contents of the second logical storage area 170 but not the first logical storage area 160.

Another function that can be provided by the emulation component 140 is translating commands and responses between formats, such as between the command sets for a HDD and a CD drive. In this way, when the data source 110 sends a command to the backup system 100 addressed to the auto-launch device (as the first logical storage area 160 is represented to be), the emulation component 140 translates the command from an auto-launch device format to the appropriate format for the storage device 150, before sending the command to the first logical storage area 160. Similarly, responses from the first logical storage area 160, in the format of the storage device 150, are translated into the auto-launch device format and sent to the data source 110 so the response appears to have come from an auto-launch device.

It should be noted that translation between CD drive and HDD formats is but one example, and in some embodiments the emulation component 140 can implement one or more analogous format translations. As used herein, a "storage device command" refers to a command in an appropriate format for the specific storage device, and a "storage device response" refers to a response in the same format. As a specific example, an "auto-launch device command" refers to a command in an appropriate format for a specific auto-launch device, and an "auto-launch device response" refers to a response in the same format.

Still another function that can be provided by the emulation component 140 is to pass commands and responses between the data source 110 and the second logical storage area 170. When the commands received by the emulation component 140 are already in the proper format for the storage device 150, the emulation component 140 does not have to translate commands or responses. Here, the emulation component 140 receives commands from the data source 110 addressed to the device that includes the writable data storage medium and passes the commands to the second logical storage area 170. In a similar fashion, responses are relayed back to the data source 110 without translation. It will be appreciated that the emulation component 140 can be configured to represent the second logical storage area 170 as being of a different type of device than the memory device 150. In these embodiments, the emulation component 140 is configured to translate between the formats of the memory device 150 and the device type of the representation of the second logical storage area 170.

Figure 2:
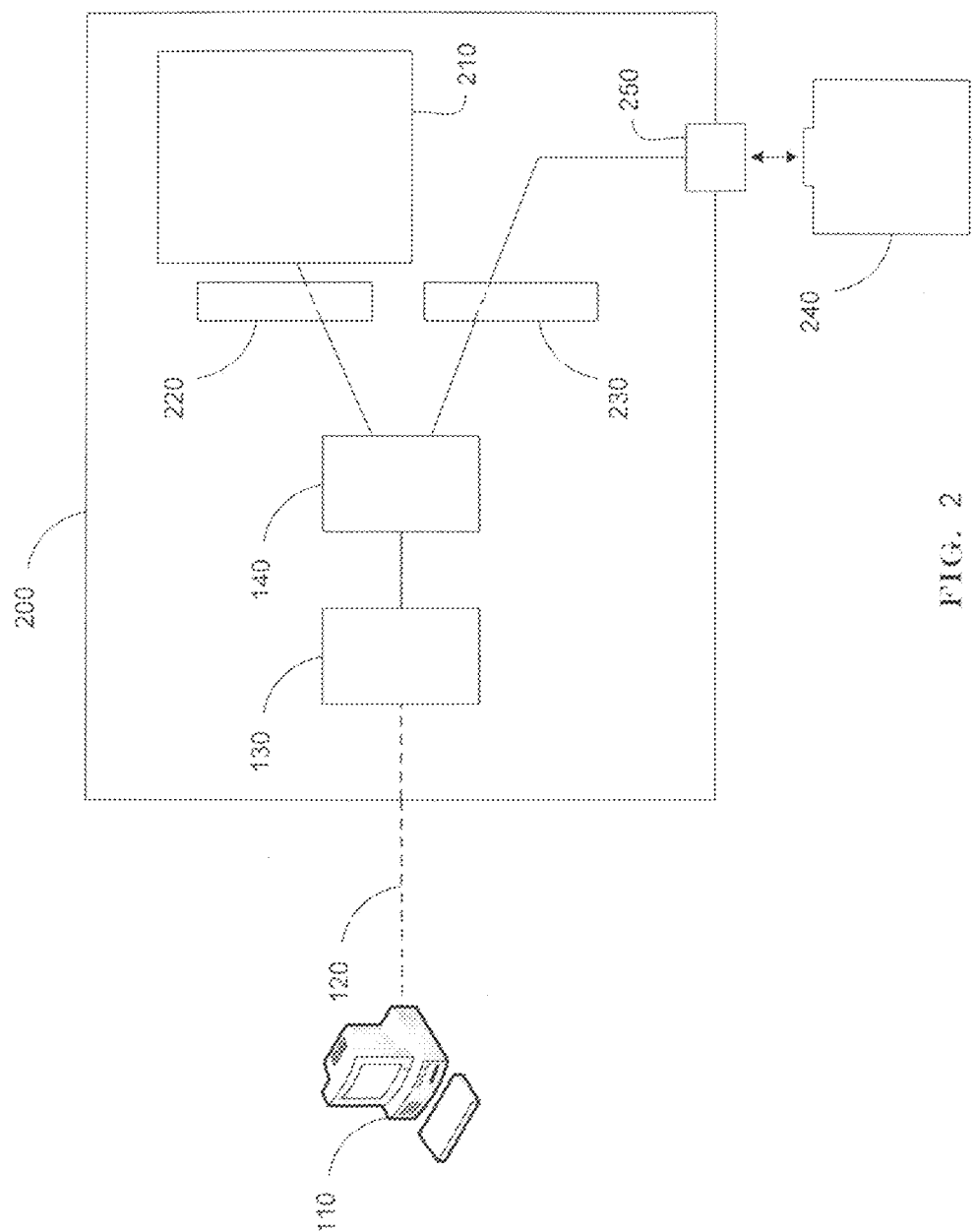
FIG. 2 is a schematic representation of a data backup system according to another exemplary embodiment of the present invention.

FIG. 2 provides a schematic representation of another exemplary embodiment of a data backup system 200 that, like the data backup system 100, is connected to the data source 110 by the connection 120. Also like the data backup system 100, the backup system 200 comprises the communication interface 130, and the emulation component 140. In this embodiment, the backup system 200 also comprises storage device 210 including a writable data storage medium and an appropriate memory device interface 220. Since the writable data storage medium of the storage device 210 only needs to include enough memory capacity to store a backup application and the like, the backup system 200 can be of a fairly small form factor, such as pocket-sized or a dongle, or be embedded in some other device configuration such as a dock or a cradle.

The data backup system 200 can also comprise a removable storage device interface 230 to allow a removable storage device 240, including a writable data storage medium, to be attached externally to the data backup system 200 by way of a communication port 250. The removable storage device interface 230 provides communication between the emulation component 140 and the removable storage device 240. In some embodiments the removable storage device interface 230 is configured to support a removable device with an integrated medium such as a flash memory device or a HDD. In other embodiments, the removable device can be one that accepts removable media, such as a CD or other optical drive.

It will be appreciated that the removable storage device interface 230 is optional as the copied files do not necessarily have to be stored to a memory device that is associated with the data backup system 200. Alternately, the backup application can direct copied files to be stored to an existing internal or external drive of the data source or to a networked drive. In still another option, the backup application can send copied files over an Internet connection to be stored at a web-based storage facility.

It should be noted that the backup systems 100, 200 can include a display or other visual indicator such as a light emitting diode (LED) to show files being copied, for instance, though some embodiments do not include the display to lower the cost and increase the durability of the backup systems 100, 200. The backup systems 100, 200 can run off of a battery, an external power source (e.g., an AC power outlet), or off of power supplied by the data source 110. In some embodiments, the connection 120 is a cable that is part of the backup system 100, 200. The backup systems 100, 200 can also be configured as a cradle designed to receive the removable storage device 240 or the data source 110 where the data source 110 is a consumer electronic device such as a digital camera.

Figure 3:
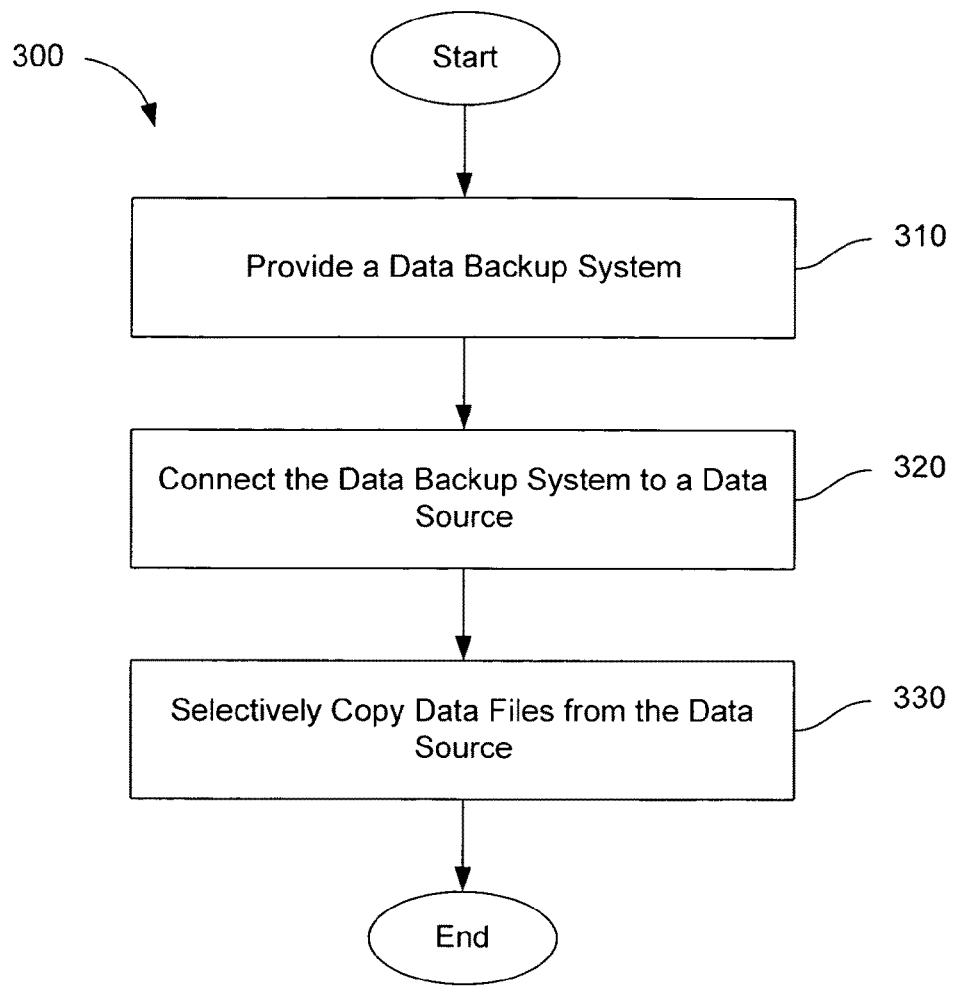
FIG. 3 is a flow-chart representation of a method for backing up data files on a data source according to an exemplary embodiment of the present invention.

FIG. 3 is a flow-chart representation of an exemplary method 300 for backing up data files from a data source. The method 300 comprises providing 310 a data backup system including a storage device storing a backup application, connecting 320 the data backup system to the data source to automatically launch the backup application, and selectively copying 330 the data files from the data source.

Providing 310 the data backup system can include providing data backup system 100 or data backup system 200, for example. In those embodiments in which the data backup system 200 is used, providing 310 the data backup system 200 can include, for example, connecting a removable storage device 240 to the communication port 250. Where the removable storage device 240 is, for example, a SD or CF memory card, connecting the removable storage device 240 to the communication port 250 can include inserting the memory card into the communication port 250. Alternately, where the removable storage device 240 is a HDD, connecting the removable storage device 240 to the communication port 250 can include coupling the communication port 250 to the removable storage device 240 with a connection such as a cable or a wireless link.

With reference to data backup systems 100, 200, connecting 320 the data backup system 100, 200 to the data source 110 can include coupling the communication interface 130 to the data source 110 with the connection 120. Connecting 320 the data backup system to the data source also includes the data source recognizing the data backup system as two new devices. For example, some operating systems periodically query unused ports for newly attached hardware. An exemplary process by which the data backup system 100, 200 can be recognized by the data source 10 as being two attached devices is described below with respect to FIG. 4.

Connecting 320 the data backup system to the data source automatically launches a backup application. Operating systems that include an automatic execution function, such as the AutoRun capability of the Windows operating system, can execute applications that are resident on an auto-launch device. Here, the automatic execution function of the data source's operating system recognizes the backup application as an application to be launched, and automatically launches the backup application to run on the data source.

Connecting 320 the data backup system to the data source can also comprise translating commands and responses between device formats as communications are passed between the data source and the data backup system, as discussed above with respect to the functionality of the emulation component 140. Thus, for example, CD read commands sent to the backup system 100 are translated to HDD read commands before being sent to the first logical storage area 160.

Selectively copying 330 the data files from the data source can include running the backup application on the data source, where the backup application is configured to search one or more storage devices associated with the data source. The backup application can, in some embodiments, search directories of internal storage devices, external storage devices, and network drives that are accessible to the data source. The backup application selectively copies files to a storage device including a writable data storage medium such as the second logical storage area 170 or the removable storage device 240.

The backup application selects files that meet at least one criterion, such as file type (e.g., .jpg) or type of content (e.g., audio files). The backup application can also find files that meet at least one of several criteria. Other examples of types of content include e-mails, business application data (e.g., Accpac and Simply Accounting files), digital video files, ebook files, contacts files, calendar files, text files, tasks files, settings files, bookmark files, and password files. Another criterion, in some embodiments, is whether a file has been previously backed up. Yet another criterion can be a particular date or a range of dates. The backup application, in some embodiments, finds files that meet the criteria by searching e-mail attachments and files embedded within other files, such as compressed files within a .zip file. The backup application can find files that are stored directly on the data source, or additionally on associated peripheral devices and networks.

The backup application can, in some embodiments, create a file path or directory structure on the writable data storage medium of the data backup system to indicate the location where a copied file was located on the data source. In other embodiments, the backup application creates a new directory structure based on chronological order, alphabetical order, file size, or some other criteria. Another alternative is for the backup application to create a monolithic file that includes all of the backed up files. Yet another alternative is for the backup application to store on the writable data storage medium the backed up files in a common directory (i.e., a flat structure) and to create an index (e.g. an XML index) that stores the information on file locations. In these embodiments, when the backed up files are restored the index is used to re-create the directory structure on the data source.

It will be appreciated that according to the method 300, user involvement can be reduced to simply making a physical connection between a data backup system and a data source. While user involvement can be reduced to one or more simple operations, it will be appreciated that options can be provided to the user through a graphical user interface (GUI) provided by the backup application on a display device of the data source. In this way the user, if desired, can customize the backup process by specifying search criteria such as a type of content or a file type to be copied. Additionally, the user can limit the scope of the backup process by drive, directory, folder, file type, file size, or date/time stamp, or the user can deselect a type of content or a specific file, drive, directory, or folder such as a temporary folder or an Internet Explorer directory.

As noted, selectively copying 330 the data files from the data source can include running the backup application on the data source. In addition to the above functions of the backup application, the backup application can also be configured to perform the following functions as part of selectively copying 330 the data files. For example, the backup application can wait a predetermined length of time and then repeat the backup process so long as the backup system remains connected to the data source 110. The backup application can also perform a self-diagnostic routine at predetermined intervals. The backup application can also be configured to wait for a predetermined period of time before performing an automatic backup to provide the user an opportunity to customize the backup process. Additionally, the backup application can be configured to selectively copy 330 the data files only upon a user command, rather than automatically. The user command can be entered through the GUI on the data source, or can be provided by a button or switch on the data backup system. Alternately, the backup application can be configured to selectively copy 330 the data files whenever a removable storage device 240 is connected to the communication port 250.

Copying 330 the data files, in some embodiments, includes determining whether the data source has been previously paired with the data backup system (e.g., the data source was previously backed up with the data backup system). This can include, for example, searching for a marker that was previously left on the data source, or comparing a marker saved on the data backup system with an identifier of the data source such as a volume label. The marker allows the backup application to recognize the data source. In some embodiments, the backup application determines a course of action based on whether the data source has been previously paired with the data backup system and if so, whether the data backup system already stores data associated with the data source. For instance, the course of action can be an automatic backup of the data source, either full or incremental, a restoration of backed up data to the data source, or a query to the user to make a selection between these or other alternatives.

Figure 4:
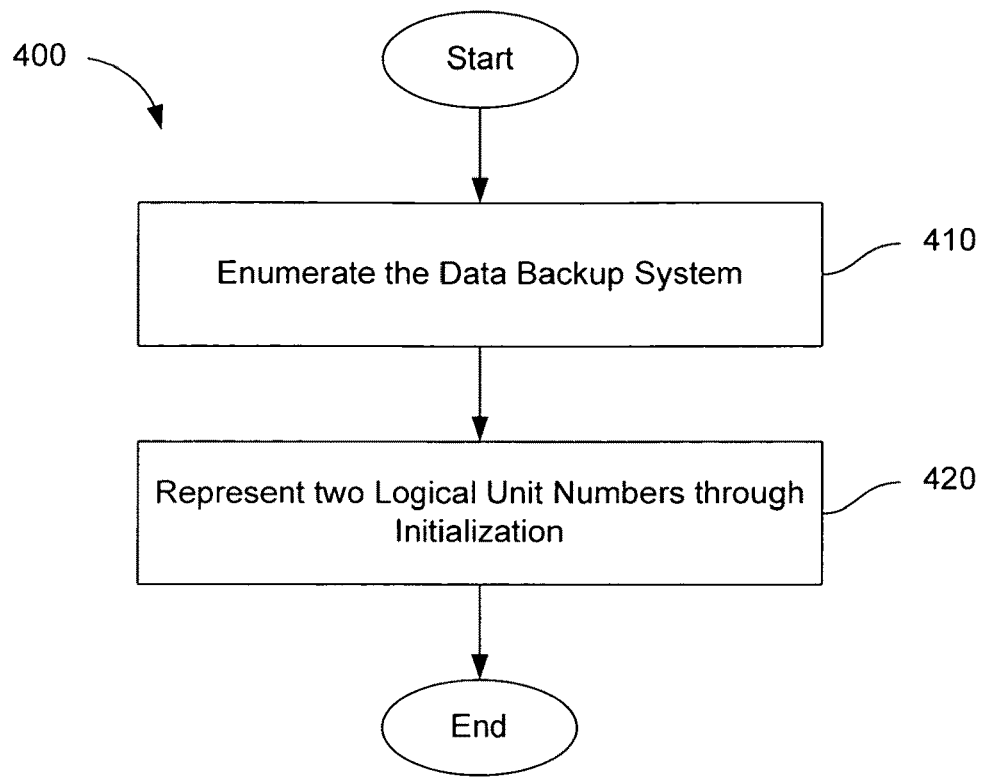
FIG. 4 is a flow-chart representation of a process by which a data backup system can be recognized by the data source as being two attached devices according to an exemplary embodiment of the present invention.

FIG. 4 is a flow-chart representation of an exemplary method 400 by which the data backup system, once detected, becomes recognized as two attached devices by the data source. Although this exemplary method 400 is described with reference to USB protocols, it will be understood that other protocols such as FireWire follow analogous processes. The method 400 comprises the data source enumerating 410 the data backup system, followed by the emulation component of the data backup system representing 420 as two Logical Unit Numbers (LUNs) through initialization.

Enumerating 410 the data backup system is performed to identify the newly attached hardware, in this case the data backup system, and how the hardware is configured for communication. Enumerating 410 comprises the data source assigning a unique device number and querying the data backup system for a device descriptor. The emulation component responds by providing a device descriptor to the data source. Enumerating 410 further comprises the data source setting an address for the data backup system. Once the address has been set, the data backup system obtains communication frames assigned to the address. Enumerating 410 can also comprise the data source requesting and receiving detailed device information from the data backup system, specifically the emulation component, such as class, subclass, and protocol.

Enumerating 410 also comprises the data source starting an appropriate USB mass storage class driver, and the USB mass storage class driver requesting the number of LUNs from the data backup system with a "GET MAX LOGICAL UNIT NUMBER" command. Enumerating 410 also comprises the data backup system, and more specifically the emulation component, responding to the "GET MAX LOGICAL UNIT NUMBER" command by communicating two LUNs to the data source.

Representing 420 the two LUNs through initialization comprises the emulation component receiving a number of SCSI commands directed to each LUN from the data source. The emulation component handles each LUN independently. The emulation component responds to those SCSI commands that it recognizes, and generates a standard error condition in response to SCSI commands that are not recognized. Each SCSI command, and any errors that are generated, are typically handled before the next SCSI command is issued to either LUN. It will be understood that the sequence of SCSI commands sent to the LUN representing a storage device including a writable data storage medium can be different from those sent to the LUN representing an auto-launch device. Additionally, SCSI commands, or a sequence of SCSI commands, may be repeated multiple times by the data source, and sequences of SCSI commands directed to the two LUNs can be interlaced.

For both LUNs, the sequence of SCSI commands starts with the USB mass storage class driver issuing an "INQUIRY" command to identify the device type. The emulation component returns a response to represent a storage device, such as second logical storage area 170 (FIG. 1), as a storage device that can include a writable data storage medium. A response of "0x00," for example, indicates that the storage device is a HDD. Similarly, the emulation component returns a response to represent a storage device, such as first logical storage area 160 (FIG. 1) as an auto-launch device. A response of "0x05," for instance, indicates that the auto-launch device is a CD drive. The storage device that can include a writable data storage medium can additionally be marked as either "removable" or "non-removable," while the auto-launch device can be marked as "removable." After this point, the sequence of SCSI commands for the two LUNs diverge. It will be appreciated that the order of SCSI commands in the sequences described below are exemplary, and the order of the SCSI commands will vary with different data sources. Also, in some instances one or more of the SCSI commands provided below are omitted, and/or other SCSI commands are included.

An exemplary sequence of SCSI commands directed to the storage device that includes the writable data storage medium continues with a "READ FORMAT CAPACITIES" request that the data source uses to determine whether the writable data storage medium is unformatted. Ordinarily, the medium of the storage device being represented is already formatted, and the emulation component responds accordingly. Otherwise, the data source will attempt to format the medium of the storage device. Next, the data source issues a "READ CAPACITY" request to identify the capacity of the writable data storage medium and its block size, and the emulation component returns this information as well. A "READ(10)" command is issued to read the first block on the writable data storage medium. The first block has a logical block addressing (LBA) value of zero (LBA=0) and contains the Master Boot Record (MBR), which itself contains the partition table for the writable data storage medium. The emulation component responds with the contents of the requested block.

A "MODE SENSE(6)" command is then used to extract the capabilities of the storage device including the writable data storage medium, such as whether the storage device contains a disk cache. The emulation component replies as appropriate to the capabilities of the storage device being represented. Another "READ(10)" command is issued to recover the first block of the file system that contains the root directory. The first block of the file system can be located at LBA=0x3F, for example, but can vary depending on the particular type of file system being represented. The emulation component returns the first block of the file system. Finally, the data source can issue a "TEST UNIT READY" request before reading the full contents of the root directory, etc. Here, the emulation component responds affirmatively so that the data source will regard the storage device that includes the writable data storage medium as operational. The data source thereafter issues more read/write requests as necessary.

An exemplary sequence of SCSI commands directed to the auto-launch device continues with a "GET CONFIGURATION" request to obtain information about the capabilities of the auto-launch device and its ability to read or write different types of optical media, e.g., CD-R, CD-RW, DVD-R, DVD+R, DVD-RW, DVD+RW, etc. The emulation component responds with capabilities that are appropriate for the auto-launch device being represented to the data source. This can be followed by a "READ CAPACITY" request to discover if there is a medium present in the auto-launch device. The emulation component is configured to respond by failing the initial attempt. In response, the data source will issue a "REQUEST SENSE" command to access the extended error information. In the reply, the emulation component sets the "Sense Key" to "UNIT ATTENTION," and sets the "Additional Sense Code" to "POWER ON." The data source will then repeat the "READ CAPACITY" request, and the emulation component will respond with a capacity, such as the size of the first logical storage area 160 (FIG. 1).

To learn what types of status change events the read-only media device supports, the data source issues an initial "GET EVENT STATUS NOTIFICATION" request, and the emulation component responds with a set of coded status fields. The data source can then repeat the "GET EVENT STATUS NOTIFICATION" request, with a field set to a status entry to be checked. If the operational status field is enabled, for example, the emulation component will respond with an operational change event, and a status code representing a feature change. This response can trigger the data source to issue further "GET CONFIGURATION" request(s), to discover which feature, if any, has changed.

The data source can also issue a "MODE SENSE(10)" request for Page Code (0x2A), known as the "MM Capabilities and Mechanical Status Page." The emulation component will respond with information that is typical for a simple auto-launch device that includes read-only support for CD-R and CD-RW media. This echoes the information that is returned in response to the "GET CONFIGURATION" request.

At this point, the data source can issue a "TEST UNIT READY" command. This triggers two sequences of request/response events in the emulation component that can support the automatic execution functionality of different operating systems. The commands in the two sequences can be interlaced, and the events will remain pending until the emulation component has passed through all of the expected states. As outlined below, both sequences are typical for an operating system such as Windows XP. The sequences, below, do not account for the number of times that a request, or a sequence of requests, can be repeated. Also, the particular sequence of events can vary depending on the type and version of the operating system executing on the data source. Additional or substitute commands can also be issued.

The first sequence comprises a series of "TEST UNIT READY" commands from the data source to the auto-launch device. The emulation component is configured to fail the first request. The data source then sends a "REQUEST SENSE" command to obtain the extended error information, and the emulation component sets the sense key to "NOT READY," with an additional sense code of "MEDIUM NOT PRESENT." The data source then repeats the "TEST UNIT READY" command, which the emulation component again fails. The data source again sends a "REQUEST SENSE" command and the emulation component responds with a sense key set to "UNIT ATTENTION," and an additional sense code of "MEDIUM MAY HAVE CHANGED." All subsequent "TEST UNIT READY" commands are typically responded to without error.

The second sequence comprises a series of "GET EVENT STATUS NOTIFICATION" requests from the data source to the auto-launch device. Following the first "TEST UNIT READY" command that triggers the first sequence, the data source issues a "GET EVENT STATUS NOTIFICATION" request with the operational change field enabled. The emulation component responds with an operational change event and a status code representing a feature change. On the following "GET EVENT STATUS NOTIFICATION" request the media status field is enabled. The emulation component responds with a media event, a status code representing new media, and a flag set to indicate that the media is present. On all subsequent "GET EVENT STATUS NOTIFICATION" requests where the media status field is enabled, the emulation component responds with a media event and with the media present flag set, but the status code will not indicate new media. In the case where a "GET EVENT STATUS NOTIFICATION" request is issued, and the expected status field is not enabled, the emulation component responds as appropriate for the current state of that event.

At the end of either or both of these sequences, the data source can send a "READ TOC/PMA/ATIP" request to read the Table Of Contents (TOC) from the medium of the auto-launch device. The TOC includes information on the number of tracks on the medium, and the start position of each. The emulation component responds with entries for a default configuration, namely, a single data track that starts immediately after the "lead-in" area. The default TOC declares that the first block of data on the medium starts at address zero. The position of a last track is fixed in the emulation component and represents the space allocated to the data on the auto-launch device, such as the backup application.

When the data source makes a read request of the auto-launch device, the emulation component automatically translates the logical address into a corresponding physical address of the storage device (e.g., first logical storage area 160 (FIG. 1)) that is being represented as the auto-launch device. In addition, where the block sizes of the storage device (e.g., a HDD partition) that is being represented as the auto-launch device (e.g., a CD drive) are different, the emulation component also translates the required amount of auto-launch device data into the appropriate number of blocks on the storage device.

After the method 400 has been completed, the data source recognizes one LUN as an auto-launch device and another LUN as a storage device including a writable data storage medium and is properly configured to communicate independently with each. Thereafter, selectively copying 330 the data files from the data source can commence. As described above, this can include the operating system of the data source automatically launching a backup application from the LUN being represented as the auto-launch device, and writing selected data from the data source to the LUN being represented as the storage device including a writable data storage medium.

Referring again to FIG. 2, and as explained elsewhere herein, a removable storage device including a writable data storage medium can be connected to the data backup system for backing up data files thereon. Also as explained herein, the removable storage device can have an integrated data storage medium such as a flash memory device or a HDD. Further, as is known in the art, various media players exist on the market that contain such a flash memory device or HDD. For example, the IPOD media player family of products marketed by Apple Computer, Inc., are media players containing either a flash memory device or a HDD. Numerous other media players containing either a flash memory device or a HDD are also known in the art such as the Microsoft ZUNE media player, the Creative ZEN media player, the iRiver CLIX media player, the Sandisk SANSA media player, etc. As such, any of these various media player devices can comprise the removable storage device.

In order to use such a media player device as a removable storage device, the data source must recognize it as such. However, the primary intended usage of a media player is to contain media content (music, images, video, etc.) typically downloaded from a data source. To simplify this download process, download or synchronization software provided by the media player manufacturer is typically installed on the data source so that when the media player is connected to the data source such synchronization will automatically occur. Unfortunately, this means that upon connection of the media player to the data source, the media player is recognized as such rather than simply being recognized as a removable storage device. This can be problematic for users wishing to use their media player as an external storage device.

Some media player manufacturers have addressed this by instructing users of their devices how to put their media player into a generic storage mode so that when the media player is connected to a data source the data source does not recognize that a media player has been connected. For example, Apple Computer has provided user instructions for how to put an IPOD media player into a "hard disk mode" so that the user can connect the IPOD media player to a personal computer and thereby use it as simply an external hard drive for data storage purposes. However, it is difficult for users to remember such special configuration instructions and, further, many users do not understand these technical nuances and therefore do not even attempt to utilize their IPOD media player for such purposes.

In a further embodiment of a backup system of the present invention, a data source will automatically recognize a media player, coupled via the backup system, as a removable storage device. In this way, the media player can be used to backup data files from the data source without requiring a user to perform special operations for putting their media player into a generic storage mode.

Figure 5:
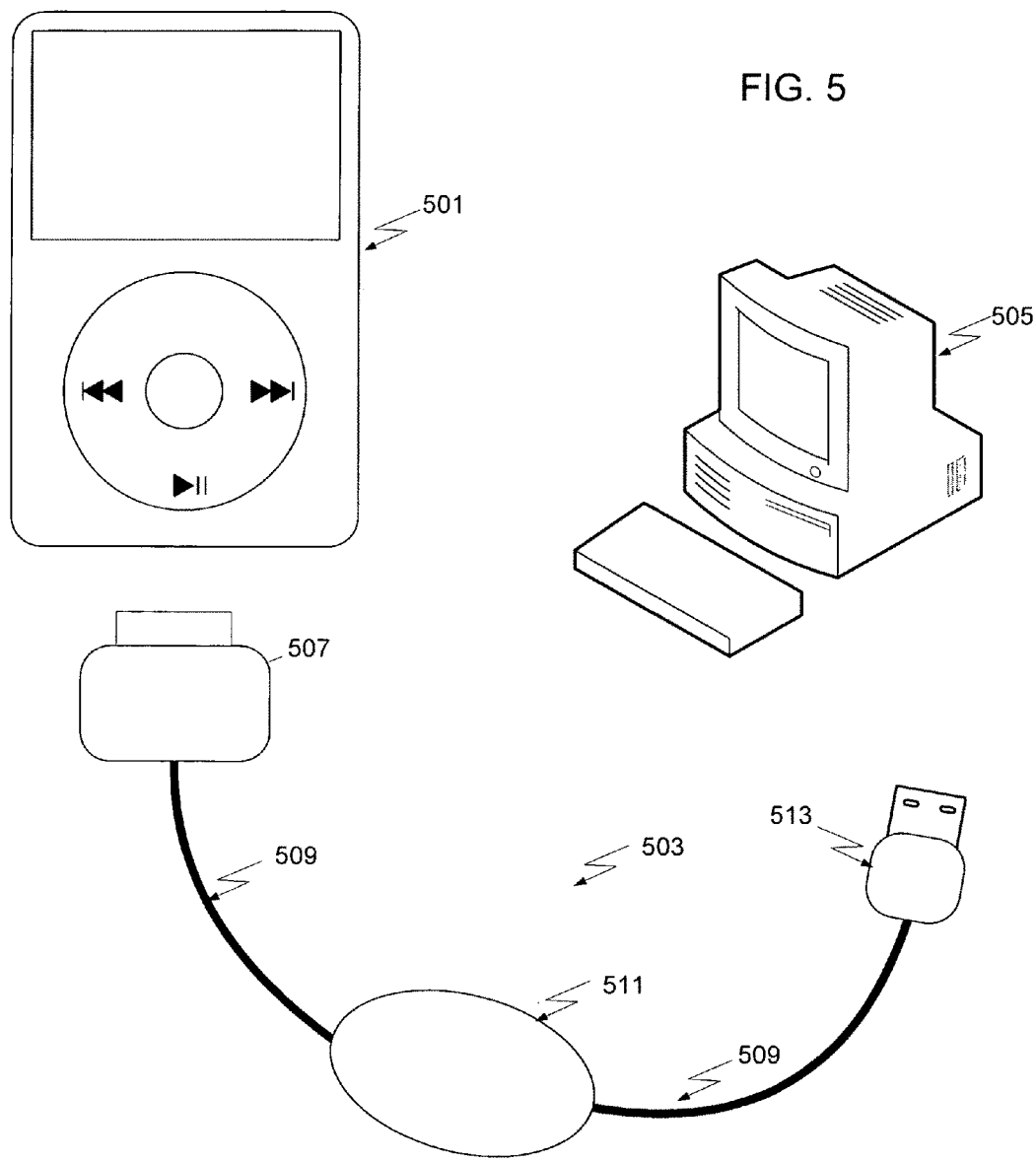
FIG. 5 is a schematic representation of a data backup system according to yet another exemplary embodiment of the present invention.

Referring now to FIG. 5, an exemplary media player 501 (in this example, an Apple Computer IPOD media player), an exemplary backup system 503 and an exemplary data source 505 can be seen. In this embodiment, the backup system 503 comprises a connector 507 for connection to the media player 501, an enclosure 511, a connector 513 for connection to the data source 505, and cables 509 for connecting the connector 507 to the enclosure 511 and for connecting the enclosure 511 to the connector 513.

The components of backup system 503, and in particular enclosure 511, are generally the same as those shown in FIG. 2 with some additional functionality as described further herein. For example, enclosure 511 can comprise communication interface 130, emulation component 140, memory device interface 220, storage device 210 containing a backup application, and removable storage device interface 230 of FIGS. 1 and 2. Additional functionality, as described further herein, includes software, firmware, hardware or some combination thereof which operates to block certain communications between the data source and the media player. As explained further herein, blocking certain communications prevents the data source 505, and any synchronization software running on the data source 505, from recognizing that a media player 501 is connected to the data source 505. Still further functionality, in an optional embodiment described further herein, includes a switching capability which alternately engages and disengages blocking the certain communications thus causing the backup system 503 to operate in a backup capacity in one modality and to operate as a standard connection for synchronization purposes between data source 505 and media player 501 in a second modality.

It is to be understood that the connectors 507 and 513 are merely examples and can comprise whatever connector is needed or desired (e.g., USB, Firewire, IPOD media player, etc.) for making electrical connection to media player 501 or data source 505, as the case may be. Further, in some embodiments, connectors 507 and/or 513 may be incorporated directly into enclosure 511, thus eliminating either or both of cables 509. In still further embodiments, backup system 503 may comprise a docking station or other physical configuration other than that shown in FIG. 5.

Figure 6:
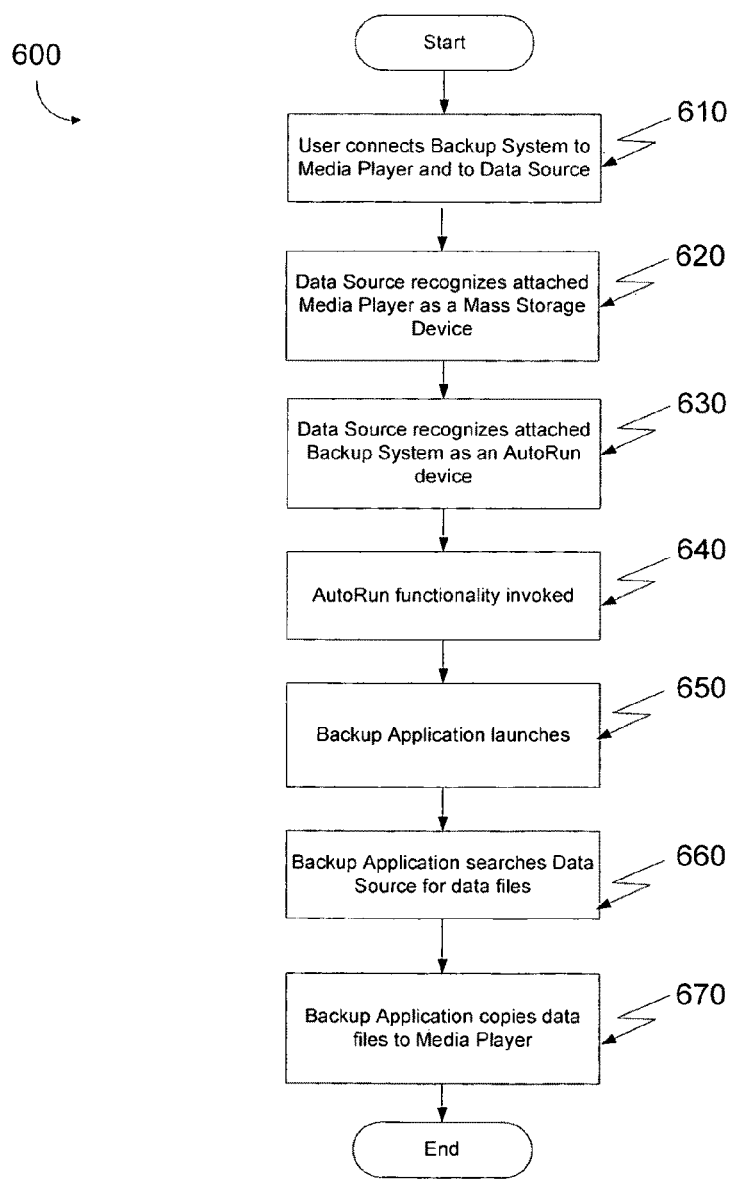
FIG. 6 is a flow-chart representation of an exemplary method for backing up data files from a data source to a media player using the data backup system of FIG. 5.

Referring now to FIG. 6, a flow-chart representation can be seen of an exemplary method 600 for backing up data files from a data source 505 to a media player 501 using backup system 503. In step 610, a user connects a backup system 503 to a media player 501 and to a data source 505. In step 620, the data source 505 recognizes the attached media player 501 as a mass storage device as explained further herein. In step 630, the data source 505 recognizes the backup system 503 as an AutoRun device. In step 640, the AutoRun functionality is invoked by the data source 505 thus causing the data source to search for and locate a backup application stored on the backup system 503. In step 650, the located backup application is launched by the data source 505. In step 660, the backup application then searches the data source 505 for data files to be backed up. In step 670, the backup application copies data files from the data source 505 to the media player 501 for backup purposes. Additional steps can include subsequent backups, data restore operations, etc., as desired. It is to be understood that these steps can be performed in alternative sequences.

Figure 7:
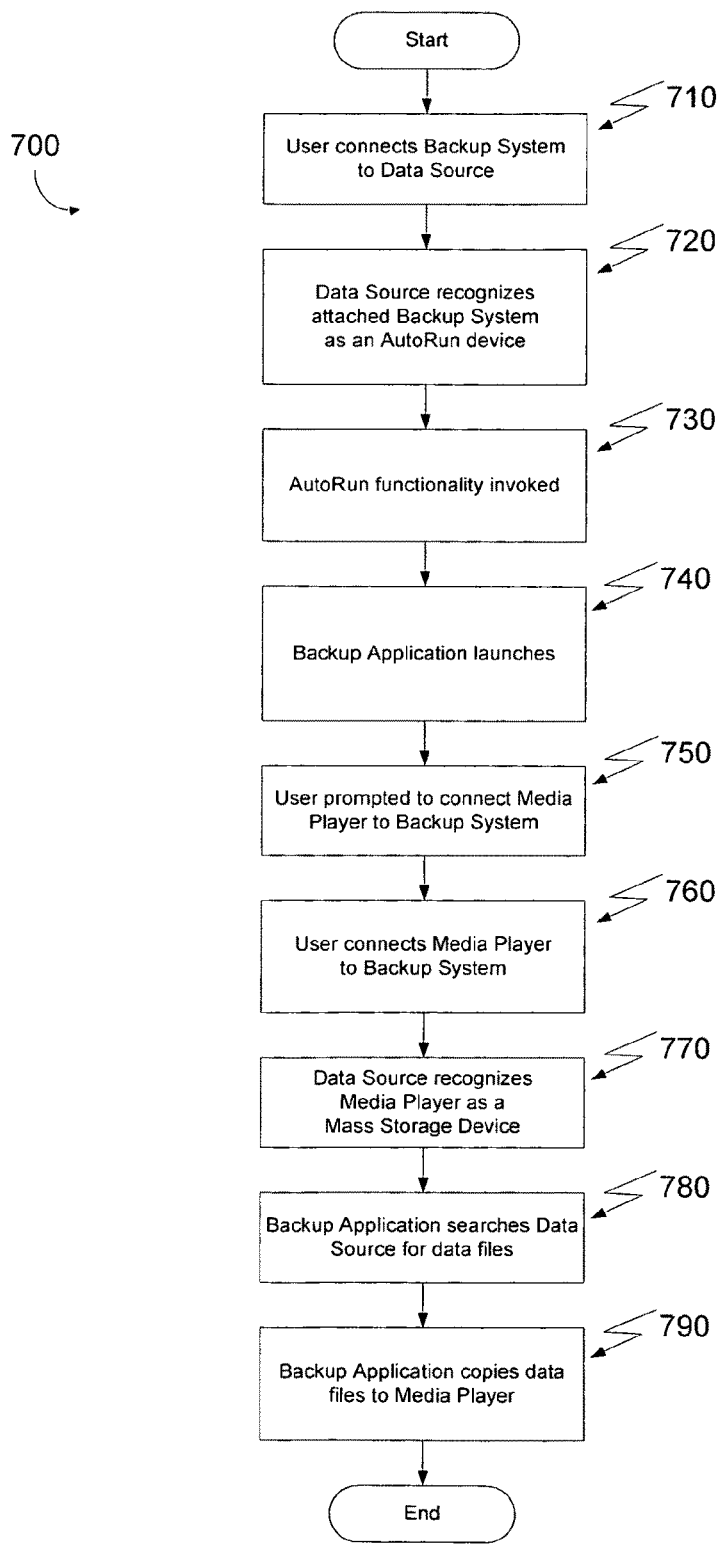
FIG. 7 is a flow-chart representation of another exemplary method for backing up data files from a data source to a media player using the data backup system of FIG. 5.

Referring now to FIG. 7, a flow-chart representation can be seen of an exemplary method 700 for backing up data files from a data source 505 to a media player 501 using backup system 503 when a user connects the backup system 503 to the data source 505 some time before connecting the backup system 503 to the media player 501.

In step 710, a user connects the backup system 503 to the data source 505. In step 720, the data source 705 recognizes the backup system 503 as an AutoRun device. In step 730, the AutoRun functionality is invoked by the data source 505 thus causing the data source 505 to search for and locate a backup application stored on the backup system 503. In step 740, the located backup application is launched by the data source 505. In step 750, since there is no removable storage device recognized by the data source because the user has not yet connected the media player 501 to the backup system 503, the user is prompted to connect the media player 501 to the backup system 503. In step 760, in response to the user prompt, the user connects the media player 501 to the backup system 503. In step 770, the data source 505 recognizes the media player 501 as a mass storage device. In step 780, the backup application searches the data source 505 for data files to be backed up. In step 790, the backup application copies data files from the data source 505 to the media player 501 for backup purposes. Additional steps can include subsequent backups, data restore operations, etc., as desired. It is to be understood that these steps can be performed in alternative sequences.

Figure 8:
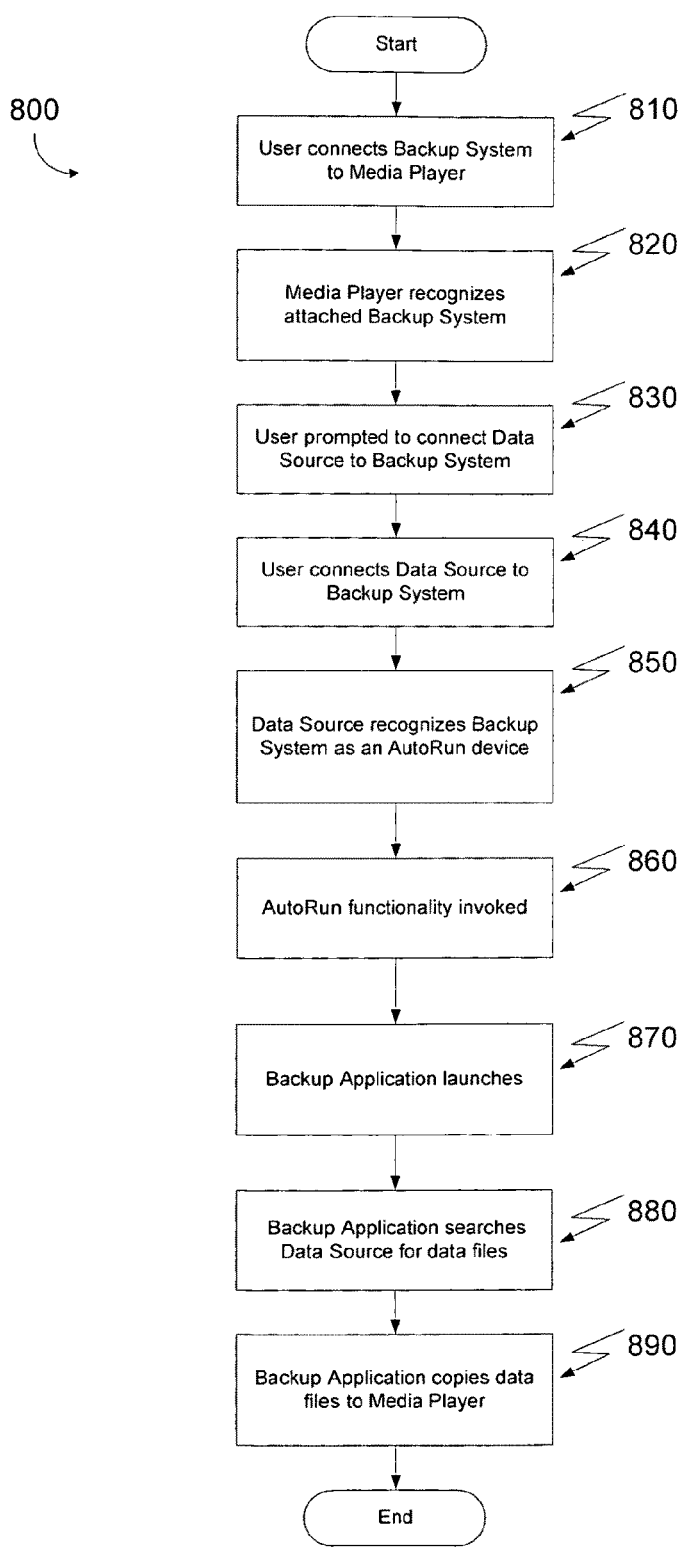
FIG. 8 is a flow-chart representation of yet another exemplary method for backing up data files from a data source to a media player using the data backup system of FIG. 5.

Referring now to FIG. 8, a flow-chart representation can be seen of an exemplary method 800 for backing up data files from a source 505 to a media player 501 using a backup system 503 when a user connects the backup system 503 to the media player 501 some time before connecting the backup system 503 to the data source 505.

In step 810, a user connects the backup system 503 to the media player 501. In step 820, the media player 501 recognizes the connection to the backup system 503. This can be accomplished using known communication protocols of the user's media player 501. In step 830, the user is prompted to connect the data source 505 to the backup system 503. This prompting may take the form of a display message on the media player 501 or, alternatively, may take the form of a display message or visual indication on the backup system 503. In step 840, in response to the user prompt, the user connects the data source 505 to the backup system 503. In step 850, the data source 505 recognizes the backup system 503 as an AutoRun device. In step 860, the AutoRun functionality is invoked by the data source 505 thus causing the data source 505 to search for and locate a backup application stored on the backup system 503. In step 870, the located backup application is launched. In step 880, the backup application searches the data source 505 for data files to be backed up. In step 890, the backup application copies data files from the data source 505 to the media player 501 for backup purposes. Additional steps can include subsequent backups, data restore operations, etc., as desired. It is to be understood that these steps can be performed in alternative sequences.

In the various embodiments described, the media player 501 synchronization software running on the data source 505 is to be prevented from recognizing that the media player 501 is connected to the data source 505 via the backup system 503 so that the media player 501 can instead be recognized by the data source 505 as a removable storage device suitable for data backup purposes. Preventing this recognition can be accomplished in a number of ways. One approach is to block certain communications between the data source 505 and the media player 501 which would otherwise be used to recognize the connection of the media player 501 to the data source 505.

Using the Apple Computer IPOD media player as one example of media player 501, there are known communications that are used to identify when an IPOD media player is connected to a data source 505. One known communication is known as the "iPodHelper Service" command which is typically sent by a data source to the IPOD media player for verifying its connection to the data source. Another known communication is one an IPOD media player typically provides back to the data source in response to a received iPodHelper Service command. If either of these communications is blocked then the IPOD media player will not be recognized as such by the data source and, instead, a connected IPOD media player will simply be viewed by the data source as an external data storage device.

These communications can be blocked or filtered by backup system 503 when a media player 501 such as an IPOD media player is connected to a data source 505 through backup system 503. Blocking these command and/or response communications trying to go through backup system 803 causes the data source 505 to recognize the media player 501 as a mass storage device rather than the data source 505 recognizing that an IPOD media player has been connected and launching synchronization software such as iTunes. This blocking or filtering functionality is provided by the emulation component within backup system 503.

In a further alternative embodiment and as explained elsewhere herein, this blocking functionality can be turned on and off by a switching mechanism of backup system 503. In this way, the backup system can operate in a backup capacity in one mode and in a media player synchronization capacity in another mode.

Implementing such switching functionality between these two modes can be implemented utilizing a variety of techniques known in the art. One possible switching implementation uses a semiconductor analog switch bearing part number NLAS7222A designed and marketed by ON Semiconductor. The NLAS7222A is designed for high speed USB 2.0 applications for differential signal data routing and/or signal routing. Since the NLAS7222A is a 2- to 1-port Double Pole Double Throw (DPDT) switch it can operate as a mechanism for engaging/disengaging the emulation component of the backup system 503 as described herein.

Figure 9:
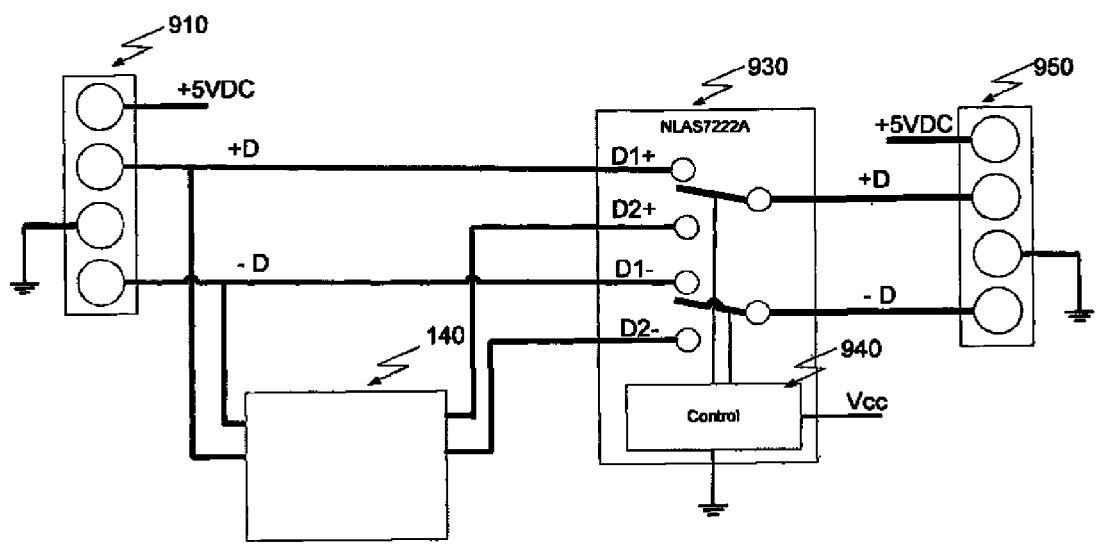
FIG. 9 is a schematic representation of an exemplary implementation of a switching functionality according to yet another exemplary embodiment of the present invention.

Referring now to FIG. 9, USB connector 910 is coupled to emulation component 140 and to switch 930 which is coupled to USB connector 950. In one embodiment, USB connector 910 functions as connector 507 to couple backup system 503 to media player 501 and USB connector 950 functions as connector 513 to couple backup system 503 to data source 505 (see FIG. 5). In this embodiment, emulation component 140 within backup system 503 blocks certain communications between the data source 505 and the media player 501 when switch 930 is in one position and conversely, those communications bypass emulation component 140 and are thus not blocked when the switch 930 is in a second position. Note that the switch position can be controlled by control mechanism 940 triggered by a button or switch located on backup system 503.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A backup system comprising:
   a first communication interface for communication with a data source;
   a second communication interface for communication with a media player;
   a storage device including computer-readable instructions of a backup application configured to backup data files from the data source to the media player; and
   an emulation component in communication between the first communication interface, the second communication interface, and the storage device, the emulation component configured to:
      block certain communications between the data source and media player;
      represent the storage device as an auto-launch device;
      receive auto-launch device commands from the data source addressed to the auto-launch device, translate the auto-launch device commands to storage device commands, and send the storage device commands to the storage device, and
      receive storage device responses from the storage device, translate the storage device responses into auto-launch device responses, and send the auto-launch device responses to the data source.

2. The data backup system of claim 1 wherein the first communication interface is a USB communication interface.

3. The data backup system of claim 1 wherein the first communication interface is a FireWire communication interface.

4. The data backup system of claim 1 wherein the second communication interface is a USB communication interface.

5. The data backup system of claim 1 wherein the second communication interface is a FireWire communication interface.

6. The data backup system of claim 1 wherein the data source is a personal computer.

7. The data backup system of claim 1 wherein the logic configured to represent the first storage device as an auto-launch device is configured to represent the first storage device as an optical device.

8. The data backup system of claim 7 wherein the optical device is a CD drive.

9. The data backup system of claim 7 wherein the optical device is a DVD drive.

10. The data backup system of claim 1 wherein the first storage device comprises solid-state memory.

11. The data backup system of claim 1 further comprising logic configured to bypass the logic configured to block certain communications.

12. The data backup system of claim 1 further comprising a switch configured to bypass the logic configured to block certain communications.

* * * * *